Patented June 10, 1947

2,422,169

UNITED STATES PATENT OFFICE 2,422,169

PRODUCTION OF AROMATIC COMPOUNDS

Donald R. May, Stamford, and James Kenneth Dixon, Riverside, Conn., assignors to American Cyanamid Company, New York, N. Y., a corporation of Maine No Drawing. Application August 21, 1945, Serial No. 611,924

15 Claims. (Cl. 260—668)

1

This invention relates to the production of aryl compounds having at least one aliphatic nuclear substituent which contains a carbon-to-carbon double bond and more particularly, to the production of such aryl compounds which have a vinyl group attached to an aryl nucleus.

The patent of Murray Gray Sturrock and Thomas Lawe, No. 2,373,982 which issued April 17, 1945, discloses a method of producing styrenes and other aryl compounds made in accordance with this invention, and this patent deals with the use of siliceous catalysts and more particularly, hydrated aluminum silicate catalysts.

An object of the present invention is to provide catalysts which are effective for the conversion of diaryl substituted paraffins, having at least two carbon atoms in the paraffin chain and having the aryl groups attached to the same carbon atom into two aromatic compounds, including one which has an aliphatic nuclear substituent containing a carbon-to-carbon double bond.

Another object of the present invention is to provide a non-siliceous catalyst for the conversion of diaryl paraffins of the aforementioned type into other aromatic compounds including aryl compounds having a nuclear substituent containing a carbon-to-carbon double bond.

These and other objects are attained by employing a titanium dioxide catalyst for the aforementioned type of reaction. Thus our process contemplates contacting a vapor comprising a compound of the class consisting of diaryl substituted paraffins having at least two carbon atoms in the paraffin chain and having the aryl groups attached to the same carbon atom in the paraffin chain, and their nuclear substituted derivatives, with a catalyst comprising titanium dioxide, alone or with other metal oxides, at a temperature of at least 350° C., and preferably at a temperature of about 500-600° C. It is also preferable that the contact time be less than 0.4 second and, in order to avoid practical difficulties, it is generally desirable to employ a contact time of about 0.001 second or more. Still another preferable feature of our process is the use of a diluent in relatively high proportions, namely, from about 5 to 150 or more mols of diluent per mol of diaryl substituted paraffin. Water vapor is one of the most desirable diluents since it may be easily condensed, and thereby separated from the final product.

The following examples in which the proportions are in parts by weight are given by way of illustration and not in limitation. The ditolylethane employed in the following examples is 1,1-di-p-tolylethane.

2

Example 1

About 450 parts of a titanium dioxide catalyst (catalyst "A") are packed into a tube which is heated and maintained at a temperature between about 500° C. and about 550° C. Ditolylethane is mixed with water vapor and passed through the tube at the rate of 260 parts per hour of ditolylethane and at the rate of 2630 parts per hour of water. A total of about 780 parts of ditolylethane is passed through the tube and about 760 parts of product are obtained by condensation of the hydrocarbons issuing from the tube. This product includes 192 parts of light oil boiling below 200° C., together with about 520 parts of hydrocarbons boiling at approximately the boiling point of ditolylethane and containing the unchanged ditolylethane along with small quantities of other substances, such as 1,1-di-p-tolylethylene, and about 20 parts of a high boiling residue.

The light oil is titrated with a potassium bromide-bromate solution and the proportion of p-methylstyrene in the light oil is calculated from the results of this titration (assuming the unsaturated content is all p-methylstyrene). Since it is theoretically possible to have only about 56.2% of p-methylstyrene in the light oil, the percentage of p-methylstyrene found by the above analysis, when subtracted from 56.2% gives the percentage of p-ethyltoluene in the light oil. The remainder of the light oil is assumed to be toluene. The foregoing method of analysis and calculations have been found to be accurate when checked by the results obtained by fractionation of the light oil, by infra-red and other spectroscopic analyses thereof. Using the foregoing method of analysis the light oil obtained in accordance with this example contains about 42 parts of p-methylstyrene, 64 parts of p-ethyltoluene and 86 parts of toluene.

The p-methylstyrene, the toluene and the ethyltoluene may each be separated from the light oil by fractionation, fractional crystallization or a combination of both. The ethyltoluene may be dehydrogenated to form p-methylstyrene if desired. The unreacted ditolylethane may be recycled through the reaction tube in the same manner as described above in connection with the original pass of the ditolylethane. By recirculating the unchanged ditolylethane, a high yield of p-methylstyrene is obtainable in accordance with our process. If the unchanged ditolylethane contains sufficient ditolylethylene to warrant separation this may be done by fractionation or by fractional crystallization, by both fractionation and fractional crystallization, or by any other suitable means, and the ditolylethylene thus obtained may be used for polymerization reactions while the purified ditolylethane is recycled to form additional quantities of p-methylstyrene.

Example 2

The procedure of Example 1 is followed, substituting 300 parts of a titanium dioxide-aluminum oxide catalyst (catalyst "B"). About 820 parts of ditolylethane are passed through the reaction tube packed with the aforementioned catalyst along with water vapor at the rate of about 241 parts per hour of ditolylethane and at the rate of about 2450 parts per hour of water. About 830 parts of hydrocarbon condensate are obtained and from this condensate, about 352 parts of a light oil boiling below about 200° C. are obtained by fractionation. About 440 parts of a hydrocarbon fraction boiling at about the boiling point of ditolylethane and containing the unchanged ditolylethane, together with small amounts of other hydrocarbons such as ditolylethylene, are recovered from the condensate leaving about 21 parts of a high boiling residue and a balance of 17 parts lost in the fractionation.

The light oil contains about 104 parts of p-methylstyrene, 85 parts of p-ethyltoluene and about 163 parts of toluene, using the method of analysis described in Example 1. The light oil may be separated into its constituents by any desired method.

Example 3

About 450 parts of titanium dioxide-cerium oxide catalyst (catalyst "C") are packed into a converter tube and heated and maintained at a temperature of about 500-550° C. Through the tube about 880 parts of ditolylethane are passed at a rate of about 284 parts per hour, together with water at a rate of 2590 parts per hour. About 860 parts of a hydrocarbon condensate are obtained and upon distillation this yields 310 parts of a light oil boiling below 200° C., 500 parts of a hydrocarbon fraction boiling at about the boiling point of ditolylethane, leaving about 31 parts of a high boiling residue and a distillation loss of about 19 parts of condensate.

Using the analysis procedure described in Example 1, the light oil is found to contain 89 parts of p-methylstyrene, 80 parts of p-ethyltoluene and 141 parts of toluene. The light oil may be fractionated in order to obtain pure p-methylstyrene if desired.

Preparation of catalyst "A"

240 parts of titanium tetrachloride are dissolved in 3 liters of water and 2 N ammonium hydroxide solution is added with thorough agitation until the pH of the solution is about 7. The gel thus produced is washed about five times after which most of the water is removed by centrifuging. The gel is then dried at about 110° C. for a few hours and then the temperature is gradually increased over a period of about 20 hours to 650° C., and maintained at that temperature for about 4 hours.

Preparation of catalyst "B"

A titanium dioxide gel is prepared and washed in accordance with the procedure described in connection with the preparation of catalyst "A" and the gel is suspended in water after which the pH thereof is lowered to about 3 by the addition of nitric acid. About 28 parts of aluminum chloride dissolved in water are added to the suspension and, thereafter, 2 N ammonium hydroxide solution is added, with vigorous agitation, until the pH is about 7, thereby precipitating a gel which is washed about 3 times by decantation. The wet gel is filtered or centrifuged and dried and heated to about 650° C. as described in connection with the preparation of catalyst "A." It will be observed that catalyst "B" contains about 10% of $Al_2O_3$.

Preparation of catalyst "C"

A titanium dioxide-cerium dioxide catalyst containing about 8.9% of cerium oxide is prepared in the manner described in accordance with the preparation of catalyst "B" by substituting 25 parts of cerous nitrate hexahydrate for the aluminum chloride.

In addition to the titanium dioxide catalysts mentioned above, other catalysts comprising titanium dioxide in substantial proportion may be employed. It is preferable that the titanium dioxide be present in a proportion at least as great as 3% of the total weight of the catalyst and for most purposes it is desirable that the titanium dioxide constitute a major proportion of the catalyst. One or more oxides may be mixed with the titanium dioxide and, for example, a catalyst may be used containing a mixture of three oxides, e. g., titanium dioxide, aluminum oxide and cerium oxide as well as catalysts containing titanium dioxide along with one another oxide as illustrated by catalyst "B" and catalyst "C." Furthermore, in place of cerium any of the rare earth elements or mixtures thereof, may be used. Other oxides which may be mixed with or coprecipitated with titanium dioxide are the solid oxides of the elements of group 4 of the periodic system. Examples of such catalysts include titanium dioxide-stannic oxide catalysts, titanium dioxide-zirconium oxide catalysts, etc. The oxides are preferably prepared in the form of gels in accordance with known principles, and the oxides may be hydrated to various degrees. Aside from the metals of group IV other metals may also be used along with titanium oxides and/or zirconium oxides such as beryllium, magnesium, etc.

Titanium dioxide catalysts are readily prepared by precipitating titanium hydroxide from an aqueous solution of a titanium salt (the titanium having a valence of 4). Another metal oxide may be precipitated on the resulting gel if desired or another metal salt may be mixed with the titanium salt and the two metals coprecipitated as hydroxides. Three or more metals including titanium may be used in the same way. After precipitation the resulting gels are washed thoroughly, dried and preferably calcined at temperatures of 150–650° C. or more. Many of the resulting products have a high surface area and are apparently porous oxide gels having different degrees of hydration.

The titanium oxide catalysts may include other substances which activate them or other substances which are entirely inert and are used merely to extend the active surface of the titanium oxide catalysts, or which are used as supports or binders for the catalysts.

Our catalysts may be supported upon finely divided substances such as silicon carbide, non-porous aluminum oxide (such as those materials sold under the trade names "Alfrax," Alundum," etc.), highly fired ceramic materials in the form of rings, saddles, grids, etc. Binding agents such as sodium silicate may be advantageously used in some cases to improve the mechanical stability of the catalysts.

The present invention does not contemplate the use of titanium silicates but other silicates such as the hydrated aluminum silicates employed by the patentees of Patent No. 2,373,982 may be admixed with our titanium oxide catalysts.

Our catalysts are employed in a finely divided condition fashioned into pellets which are preferably no larger than about 5 mms. in their greatest diameter. The pellets may be in any desired shape such as cubical, spherical, or of an irregular granular shape. When large pellets are employed the vapor velocity varies widely between the center and outside of the pellet, and therefore the contact time at the center of the pellet is longer than desirable. It is preferable that the particles be as fine as possible in order to reduce the difference between the maximum and minimum vapor velocities which occur in the catalyst bed. Obviously the particle size should not be so small that the catalyst packs thereby causing the vapors to channel through the catalyst instead of passing therethrough in a uniform manner.

The converter into which the catalyst is packed may be a tube constructed of steel, silica or any other suitable material and in large scale operations the converter may comprise a plurality of such tubes or it may be a shell-type converter having one or more layers or trays of catalyst therein.

A short contact time of the diaryl paraffin with the catalyst is desirable in carrying out the reactions in accordance with this invention. While longer contact times may be used if desired it is generally preferable that the contact time be less than 0.4 second. The contact times between about 0.1 and 0.05 are especially suitable. Generally it is desirable to employ a contact time of 0.001 second or longer, in order to avoid practical difficulties. The calculation of the contact of the vapor with the catalyst is a complex matter, and in order to simplify this calculation we have used the term "contact time" herein to mean those values which are computed on the assumption that the catalyst contains 50% voids and neglecting both the pressure drop through the catalyst and the increase in volume which occurs during the reaction. The contact time employed in the foregoing examples is about 0.1 second.

Inasmuch as the reaction is neither highly exothermic nor endothermic it is not necessary to supply much more heat than that necessary to compensate for conduction and radiation losses in order to maintain the reaction temperature of the vapors passing through the catalyst, providing that the vapors which are fed to the catalyst are preheated to about the desired reaction temperature, and providing that a high ratio of diluent to the diaryl paraffin is employed. We therefore prefer that the vapors fed to the catalyst be preheated to the reaction temperature. Any suitable method of heating the converter may be employed such as, for example, electrical resistance heaters.

The following are illustrative of the aliphatic compounds having two aryl substituents attached to the same carbon atom thereof which may be converted into the mononuclear aromatic compounds in accordance with the present invention: 1,1-diphenylethane, each of the 1-phenyl-1-tolylethanes, each of the 1,1-ditolylethanes, each of the 1-phenyl-1-xylylethanes, each of the 1-tolyl-1-xylylethanes, each of the 1,1-dixylylethanes, 1,1-diphenyl-propane, each of the 1-phenyl-1-tolylpropanes, each of the 1,1-ditolylpropanes, each of the 1-tolyl-1-xylylpropanes, each of the 2,2-ditolylpropanes, each of the 1,1-di-(monochlorophenyl)-ethanes, each of the 1,1-di-dichlorophenyl)-ethanes, each of the 1,1-di-(monohydroxy phenyl)-ethanes, each of the 1,1-dicresylethanes, each of the 2,2-dicresylpropanes, each of the 1,1-dinaphthylethanes, each of the 1,1-dixenylethanes, each of the 1-tolyl-1-naphthylethanes, and the like and their nuclear substituted halogen, hydroxyl and other derivatives all of which are volatile at the temperature and pressure used in the process. Those substances containing tolyl, xylyl, cresyl, xenyl, monochlorophenyl and dichlorophenyl groups may be attached to the carbon atoms of the paraffin chain at the ortho, meta or para positions and when two of these groups are present they may be attached in the same or different positions.

The reaction temperature may be varied from about 350° up to about 600° C. or even higher in some cases. Temperatures above 600° C. cause some pyrolysis loss but on the other hand some of the diaryl paraffins are not easily decomposed at lower temperatures. It is particularly important to employ a short time of contact when temperatures in the neighborhood of 600° C. are used in order to avoid an undesired amount of pyrolysis loss due to side-reactions. Among such side-reactions are those which lead to the formation of polynuclear compounds including anthracene derivatives.

One of the advantages of employing a short contact time with catalysts is that the life thereof is prolonged. With contact times of the order of 1 second or more the catalyst may become fouled in a relatively short period of time due to the deposition of carbonaceous materials on the surface of the catalyst. When it is necessary or desirable to reactivate the catalyst this may be done by passing heated air, preferably mixed with steam or carbon dioxide, through the catalyst. The temperature of the air and steam mixture should be raised to about 500°–650° C. The air enables the carbon to burn whereas the steam or carbon dioxide which is used in conjunction with the air keeps the temperature from rising too high which might cause a reduction in the activity in the catalyst. Generally, at temperatures of about 500° C. the carbon begins to burn off and the heat of this reaction causes the temperature to rise to about 650° C. without the application of any external heat.

It may be seen that the proximity of the reactivation temperature to the reaction temperature greatly simplifies the change from normal operation to reactivation and back to normal operation. Since the normal highly active life of the catalyst generally exceeds the time required for its reactivation the operation of two or more converters in parallel is readily accomplished. The short time of reactivation enables one to keep one or more converters in normal operation while one or more other converters are being reactivated.

Any material which is volatile and which does not react with the diaryl substituted paraffin which is to be used in accordance with our process and which does not react with the products formed by the decomposition of the diaryl substituted paraffin may be used as a diluent. Among these, some examples are: water, the hydrocarbons (such as benzene and toluene), the fixed gases (such as nitrogen and carbon dioxide), etc. Water vapor is the preferred diluent inasmuch as it may be readily condensed and therefore separated from the products of the reaction, whereas the fixed gases or the hydrocarbons are somewhat more difficult to separate from the product and such separation requires higher expenditures than are required for the separation of water from the product. Water vapor also has an additional advantage in that it may maintain the catalyst in highly active form.

One of the most important reasons for the use of a diluent is that the time of contact of the diaryl substituted paraffin with the catalyst can be reduced to the desired point easily. It has been found that in order to obtain the short contact times which are desirable in accordance with the present invention the molal ratio of diluent to the diaryl substituted aliphatic compound in the feed to the catalyst is preferably between about 5:1 and 150:1, or more. If the feed can be supplied rapidly enough to provide a low contact time without the use of the large proportion of diluent the ratio of diluent to the diaryl substituted paraffin may be as low as 1:2.

It has been found that it is frequently desirable to convert only a few percent of the diaryl substituted paraffin fed to the catalyst in one pass but by recovering the unconverted diaryl substituted paraffin and recirculating it from one to five times or more, a high yield is obtained very economically.

Our process may be operated at elevated or reduced pressure and under some conditions it may be particularly advantageous to operate under reduced pressure. If the diaryl substituted paraffin which is to be used in accordance with present processes is not readily volatile at ordinary pressure reduced pressures may be used to facilitate the operation of our process.

The present process is a convenient and economical method of converting the diaryl substituted paraffins, having at least two carbon atoms in the paraffin chain and having the two aryl groups attached to the same carbon atom, into other aromatic compounds, one of which contains a side chain having an ethylenic group. The vinyl substituted aryl compounds prepared in accordance with the present invention have wide utility in the production of polymers which in turn are useful for molding, casting, laminating and for many other purposes. Furthermore, pure aryl compounds such as xylene in extremely high purity may be produced simultaneously with the production of the aromatic compound containing an ethylenic side chain. Thus when a diaryl substituted paraffin is cracked in accordance with this invention one molecule of an aryl compound having an ethylenic side chain is obtained together with one molecule of a pure aryl compound which does not have an ethylenic side chain. Such pure aryl compounds, as, for example, pure m-xylene or pure p-xylene, find utility in the synthesis organic compounds where the presence of one or more of the possible isomers is undesired.

Obviously many variations and changes in the compositions, processes and products disclosed herein may be made without departing from the spirit and scope of the invention as defined in the appended claims.

We claim:

1. A process of producing a plurality of aromatic compounds which comprises heating a paraffin having at least two carbon atoms and having two aryl substituents attached to one of said carbon atoms at a temperature which will cause said paraffin to decompose into a plurality of aromatic compounds in the presence of a catalyst and which is at least 350° C. in the presence of a titanium oxide catalyst.

2. A process of producing a plurality of aromatic compounds which comprises contacting a substance selected from the class consisting of paraffins having at least two carbon atoms in the carbon chain and having two aryl substituents attached to one carbon atom thereof, and their nuclear substituted derivatives, at a temperature which will cause said paraffin to decompose into a plurality of aromatic compounds in the presence of a catalyst and which is at least 350° C. with a titanium oxide catalyst which promotes simple molecular decomposition into two aromatic compounds.

3. A process of producing a plurality of aromatic compounds which comprises mixing a substance selected from the class consisting of diaryl substituted paraffins having at least two carbon atoms in the paraffin chain and in which both aryl groups are attached to the same carbon atom and their nuclear substituted derivatives with a diluent, contacting the resulting mixture thereof with a titanium oxide catalyst and maintaining the temperature of said mixture at a temperature which will cause said paraffin to decompose into a plurality of aromatic compounds in the presence of a catalyst and which is at least 350° C. during the time it is in contact with said catalyst.

4. In a method of producing mononuclear aromatic compounds the steps which comprise heating one of a class of substances consisting of asymmetric diarylethane, the aryl groups of which are mononuclear, and their nuclear substituted derivatives at a temperature which will cause said paraffin to decompose into a plurality of aromatic compounds in the presence of a catalyst and which is at least 350° C. passing the resulting heated substance through a titanium oxide catalyst which promotes simple molecular decomposition together with a diluent, at such a rate as to provide a contact time with the catalyst of between about 0.001 second and about 0.4 second.

5. A process as in claim 4 wherein said diluent is water vapor.

6. In a method of producing a plurality of aromatic compounds the steps of which comprise heating a substance of the class consisting of diaryl substituted paraffins having at least two carbon atoms in the paraffin chain and having both aryl groups attached to one of the carbon atoms, and their nuclear substituted derivatives, to a temperature which will cause said paraffin to decompose into a plurality of aromatic compounds in the presence of a catalyst and which is at least 350° C. passing said substance through a titanium oxide catalyst with a contact time of less than 0.4 second.

7. In a method of producing a plurality of aromatic compounds the step which comprises contacting asymmetric diarylethane with a titanium oxide catalyst at a temperature which will cause said paraffin to decompose into a plurality of aromatic compounds in the presence of a catalyst and which is at least 350° C. and for a contact time of less than 0.4 second.

8. In a method of producing a plurality of aromatic compounds the step which comprises contacting an asymmetric ditolylethane with a titanium oxide catalyst at a temperature which will cause said paraffin to decompose into a plurality of aromatic compounds in the presence of a catalyst and which is at least 350° C. and for a contact time of less than 0.4 second.

9. In a method of producing a plurality of aromatic compounds the step which comprises contacting a 1,1-di-xylylethane with a titanium oxide catalyst at a temperature which will cause said paraffin to decompose into a plurality of aromatic compounds in the presence of a catalyst and which is at least 350° C. and for a contact time of less than 0.4 second.

10. A process as in claim 2 wherein the catalyst is a titanium oxide-aluminum oxide catalyst.

11. A process as in claim 2 wherein the catalyst is a titanium oxide-cerium oxide catalyst.

12. A process as in claim 2 wherein the catalyst is a titanium oxide-zirconium oxide catalyst.

13. In a method of producing a plurality of aromatic compounds, the step which comprises contacting an asymmetric diarylethane with a titanium oxide-zirconium oxide catalyst at a temperature which will cause said paraffin to decompose into a plurality of aromatic compounds in the presence of a catalyst and which is at least 350° C. and for a contact time of less than 0.4 second, said diarylethane having at least one aryl group substituted with an alkyl group.

14. In a method of producing a plurality of aromatic compounds, the step which comprises contacting an asymmetric diarylethane with a titanium oxide-zirconium oxide catalyst at a temperature which will cause said paraffin to decompose into a plurality of aromatic compounds in the presence of a catalyst and which is at least 350° C. and for a contact time of less than 0.4 second, said diarylethane having at least one aryl group substituted with a hydroxyl group.

15. In a method of producing a plurality of aromatic compounds, the step which comprises contacting an asymmetric diarylethane with a titanium oxide-zirconium oxide catalyst at a temperature which will cause said paraffin to decompose into a plurality of aromatic compounds in the presence of a catalyst and which is at least 350° C. and for a contact time of less than 0.4 second, said diarylethane having at least one aryl group substituted with an alkyl group and a hydroxyl group.

DONALD R. MAY.
JAMES KENNETH DIXON.

REFERENCES CITED

The following references are of record in the file of this patent:

UNITED STATES PATENTS

| Number | Name | Date |
|---|---|---|
| 2,373,982 | Sturrock et al. | Apr. 17, 1945 |
| 2,382,239 | Lee | Aug. 14, 1945 |
| 2,344,911 | Young | Mar. 21, 1944 |
| 2,282,327 | Dreisbach | May 13, 1942 |

OTHER REFERENCES

Sheibley et al., Jour. Am. Chem. Soc., vol. 62, 840–1 (1940). (Pat. Off. Lib.)

---

Certificate of Correction

Patent No. 2,422,169.  June 10, 1947.

DONALD R. MAY ET AL.

It is hereby certified that errors appear in the printed specification of the above numbered patent requiring correction as follows: Column 4, line 28, after "more" insert *other*; line 33, for "another" read *other*; column 6, line 8, before the syllable and hyphen "dichlo-" insert an opening parenthesis; and that the said Letters Patent should be read with these corrections therein that the same may conform to the record of the case in the Patent Office.

Signed and sealed this 29th day of July, A. D. 1947.

[SEAL]

LESLIE FRAZER,
*First Assistant Commissioner of Patents.*

8. In a method of producing a plurality of aromatic compounds the step which comprises contacting an asymmetric ditolylethane with a titanium oxide catalyst at a temperature which will cause said paraffin to decompose into a plurality of aromatic compounds in the presence of a catalyst and which is at least 350° C. and for a contact time of less than 0.4 second.

9. In a method of producing a plurality of aromatic compounds the step which comprises contacting a 1,1-di-xylylethane with a titanium oxide catalyst at a temperature which will cause said paraffin to decompose into a plurality of aromatic compounds in the presence of a catalyst and which is at least 350° C. and for a contact time of less than 0.4 second.

10. A process as in claim 2 wherein the catalyst is a titanium oxide-aluminum oxide catalyst.

11. A process as in claim 2 wherein the catalyst is a titanium oxide-cerium oxide catalyst.

12. A process as in claim 2 wherein the catalyst is a titanium oxide-zirconium oxide catalyst.

13. In a method of producing a plurality of aromatic compounds, the step which comprises contacting an asymmetric diarylethane with a titanium oxide-zirconium oxide catalyst at a temperature which will cause said paraffin to decompose into a plurality of aromatic compounds in the presence of a catalyst and which is at least 350° C. and for a contact time of less than 0.4 second, said diarylethane having at least one aryl group substituted with an alkyl group.

14. In a method of producing a plurality of aromatic compounds, the step which comprises contacting an asymmetric diarylethane with a titanium oxide-zirconium oxide catalyst at a temperature which will cause said paraffin to decompose into a plurality of aromatic compounds in the presence of a catalyst and which is at least 350° C. and for a contact time of less than 0.4 second, said diarylethane having at least one aryl group substituted with a hydroxyl group.

15. In a method of producing a plurality of aromatic compounds, the step which comprises contacting an asymmetric diarylethane with a titanium oxide-zirconium oxide catalyst at a temperature which will cause said paraffin to decompose into a plurality of aromatic compounds in the presence of a catalyst and which is at least 350° C. and for a contact time of less than 0.4 second, said diarylethane having at least one aryl group substituted with an alkyl group and a hydroxyl group.

DONALD R. MAY.
JAMES KENNETH DIXON.

REFERENCES CITED

The following references are of record in the file of this patent:

UNITED STATES PATENTS

| Number | Name | Date |
|---|---|---|
| 2,373,982 | Sturrock et al. | Apr. 17, 1945 |
| 2,382,239 | Lee | Aug. 14, 1945 |
| 2,344,911 | Young | Mar. 21, 1944 |
| 2,282,327 | Dreisbach | May 13, 1942 |

OTHER REFERENCES

Sheibley et al., Jour. Am. Chem. Soc., vol. 62, 840-1 (1940). (Pat. Off. Lib.)

---

Certificate of Correction

Patent No. 2,422,169.                                   June 10, 1947.

DONALD R. MAY ET AL.

It is hereby certified that errors appear in the printed specification of the above numbered patent requiring correction as follows: Column 4, line 28, after "more" insert *other*; line 33, for "another" read *other*; column 6, line 8, before the syllable and hyphen "dichlo-" insert an opening parenthesis; and that the said Letters Patent should be read with these corrections therein that the same may conform to the record of the case in the Patent Office.

Signed and sealed this 29th day of July, A. D. 1947.

[SEAL]

LESLIE FRAZER,
*First Assistant Commissioner of Patents.*